United States Patent
Huang

(10) Patent No.: US 9,411,768 B2
(45) Date of Patent: Aug. 9, 2016

(54) HDMI-CEC DEVICE AND ADDRESS ALLOCATION METHOD OF HDMI-CEC DEVICE NETWORK

(71) Applicant: HON HAI PRECISION INDUSTRY CO., LTD., New Taipei (TW)

(72) Inventor: Jeng-Li Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 405 days.

(21) Appl. No.: 14/135,779

(22) Filed: Dec. 20, 2013

(65) Prior Publication Data

US 2014/0215113 A1    Jul. 31, 2014

(30) Foreign Application Priority Data

Jan. 29, 2013    (TW) .............................. 102103238 A

(51) Int. Cl.
G06F 13/14 (2006.01)
G06F 13/42 (2006.01)
H04N 21/4363 (2011.01)
H04N 21/436 (2011.01)
H04N 21/442 (2011.01)
H04N 21/6402 (2011.01)

(52) U.S. Cl.
CPC ...... *G06F 13/4282* (2013.01); *H04N 21/43615* (2013.01); *H04N 21/43635* (2013.01); *H04N 21/44227* (2013.01); *H04N 21/44231* (2013.01); *H04N 21/6402* (2013.01)

(58) Field of Classification Search
None
See application file for complete search history.

(56) References Cited

U.S. PATENT DOCUMENTS

| 2009/0237571 | A1* | 9/2009 | Horimoto | H04N 5/4401 348/725 |
| 2009/0296731 | A1* | 12/2009 | Lida | G06F 3/1454 370/449 |
| 2009/0322948 | A1* | 12/2009 | Funabiki | G06F 3/14 348/571 |
| 2009/0327474 | A1* | 12/2009 | Ida | H04L 12/2809 709/223 |
| 2011/0038338 | A1* | 2/2011 | Funabiki | H04L 12/2805 370/329 |
| 2012/0131153 | A1 | 5/2012 | Schmidt et al. | |
| 2015/0106486 | A1* | 4/2015 | Kambhatla | H04L 29/12254 709/221 |

FOREIGN PATENT DOCUMENTS

| TW | 200943952 A | 10/2009 |
| TW | 201223219 A | 6/2012 |
| WO | 2009108197 A1 | 9/2009 |

* cited by examiner

*Primary Examiner* — Ilwoo Park
(74) *Attorney, Agent, or Firm* — ScienBiziP, P.C.

(57) ABSTRACT

A method allocates physical addresses HDMI-CEC devices within an HDMI-CEC device network. The HDMI-CEC device network includes a plurality of HDMI-CEC devices consisting of at least two root devices, a plurality of parent devices, and a plurality of slave devices. Each of the root devices has a root ID. When a slave device is plug into an HDMI interface of a parent device, the parent device allocates a root ID and a physical address for the slave device. The slave device creates a route table according to the allocated root ID and physical address, to establish a serial communication with the parent device.

13 Claims, 3 Drawing Sheets

HDMI-CEC DEVICE AND ADDRESS ALLOCATION METHOD OF HDMI-CEC DEVICE NETWORK

BACKGROUND

1. Technical Field

Embodiments of the present disclosure relate generally to high definition multimedia interface consumer electronics control (HDMI-CEC) devices, and particularly to an address allocation method of an HDMI-CEC device.

2. Description of Related Art

High-Definition Multimedia Interface (HDMI) is a compact audio/video interface for transferring video data and audio data from a HDMI-compliant device (root device) to a compatible computer monitor, video projector, digital television, or digital audio device. Consumer electronics control (CEC) is an HDMI feature designed to allow HDMI devices to control each other and allow the user to operate multiple devices with one remote control handset. The devices connected to the same root device (e.g., television) form an HDMI-CEC device network. All the devices within the HDMI-CEC device network can be controlled by one remote control handset. However, since the devices connected to different root devices cannot be involved in one HDMI-CEC device network, the devices connected to different root devices cannot be controlled and operated using the one remote control handset, which is a little inconvenient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one." The reference "a plurality of" means "at least two."

Figure 1:
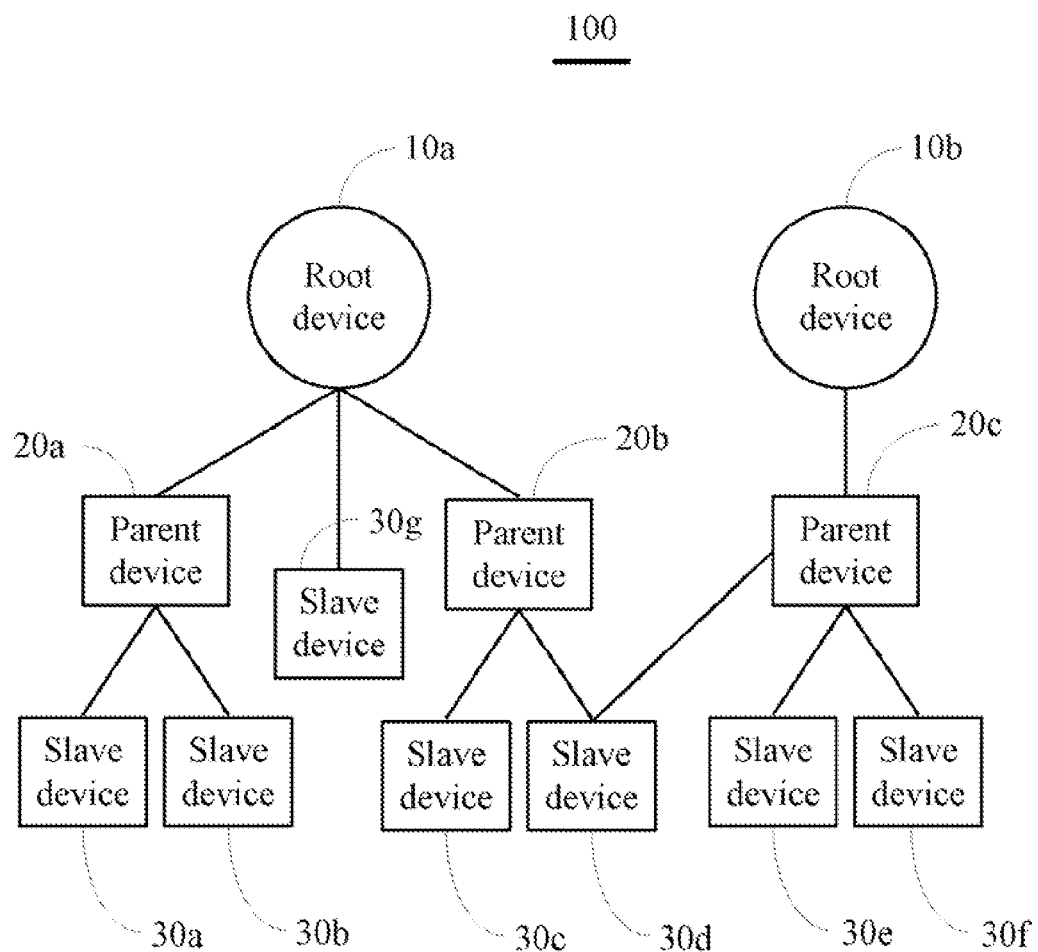
FIG. 1 is a schematic block diagram of an embodiment of an HDMI-CEC device network including a plurality of HDMI-CEC devices.

FIG. 1 shows a high definite multimedia interface consumer electrics control (HDMI-CEC) network 100. The HDMI-CEC device network 100 includes a plurality of HDMI-CEC devices. The plurality of HDMI-CEC devices are directly or indirectly connected with each other to form a tree having a plurality of nodes. The plurality of HDMI-CEC devices include at least two root devices such as 10a and 10b, a plurality of parent devices such as 20a, 20b, and 20c, and a plurality of slave devices such as 30a, 30b . . . 30g. In this embodiment, the root devices are defined to be root nodes of the tree, which can be televisions such as digital televisions (DTV), high definition televisions (HDTV), and network televisions, for example. The parent devices are defined to be parent nodes of the tree, which can be HDMI connectors and network switches, for example. The slave devices are defined to be slave nodes of the tree, which can be cameras, set-top boxes (STB), DVD players, media players, for example.

In this embodiment, the root devices and the parent devices each have at least one HDMI interface. At least one parent device and/or at least one slave device is plugged in the at least one HDMI interface of each root device. At least one slave device is plugged into the at least one HDMI interface of each parent device. Thus, a serial communication among the root devices, the parent devices, and the slave devices are established. It is understood that, the words "parent device" and "slave device" are relativity concepts defined to explain the present disclosure. For example, when the parent device 20a is plugged into the HDMI interface of the root device 10a, the parent device 20a is defined to be a slave device of the root device 10a, and the root device 10a is defined to be a parent device of the parent device 20a. A parent device can become a slave device when all slave devices of the parent device are unplugged. Each root device is a particular parent device which cannot become a slave device. When an HDMI-CEC device is plugged into a slave device, the slave device becomes a parent device of the HDMI-CEC device. That is, the plurality parent devices include at least two root devices.

In this embodiment, each root device has a root identification (ID). For example, the root ID of the root device 10a is "0000," and the root ID of the root device 10b is "0001."

Figure 2:
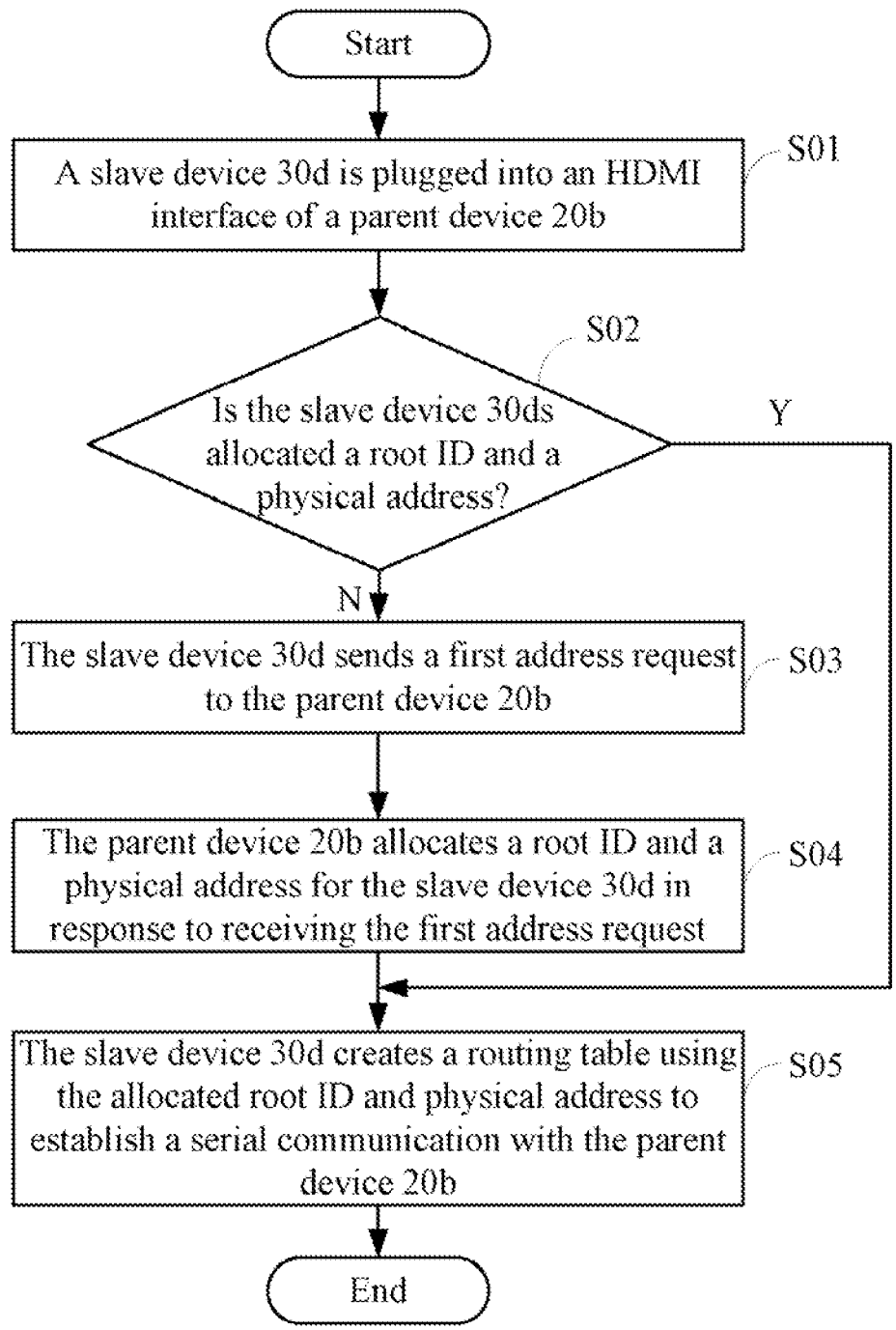
FIG. 2 is a flowchart of one embodiment of an address allocation method of HDMI-CEC devices of the HDMI-CEC device network when a slave device is plugged into an HDMI interface of a parent device.

FIG. 2 shows a flowchart of one embodiment of an address allocation method when a slave device is plugged into the HDMI interface of a parent device. In the embodiment, a condition that the slave device 30d is plugged into the HDMI interface of the parent device 20b is taken as an example. Depending on the embodiment, additional steps may be added, others removed, and the ordering of the steps may be changed.

In step S01, the slave device 30d is plugged into the HDMI interface of the parent device 20b.

In step S02, the slave device 30d confirms whether or not a root ID and a physical address has been allocated for the slave device 30d. If the slave device 30d has been allocated a root ID and a physical address, step S05 is implemented. Otherwise, step S03 is implemented.

In step S03, the slave device 30d sends a first address request to the parent device 20b.

In step S04, the parent device 20b allocates a root ID and a physical address for the slave device 30d in response to receiving the first address request.

In step S05, the slave device 30d creates a routing table using the allocated root ID and physical address to establish a serial communication with the parent device 20b.

When the serial communication between the slave device 30d and the parent device 20b is established, the root device 10a, the parent device 20b, and the slave device 30d can communicate with each other because the parent device 20b is plugged into the HDMI interface of the root device 10a. Thus, the root device 10a, the parent device 20b, and the slave device 30d can be operated or commanded using one remote control handset. In this embodiment, the root ID allocated for the slave device 30d is the same as the root ID (e.g., "0000") of the root device 10a that communicates with the parent device 20b.

Figure 3:
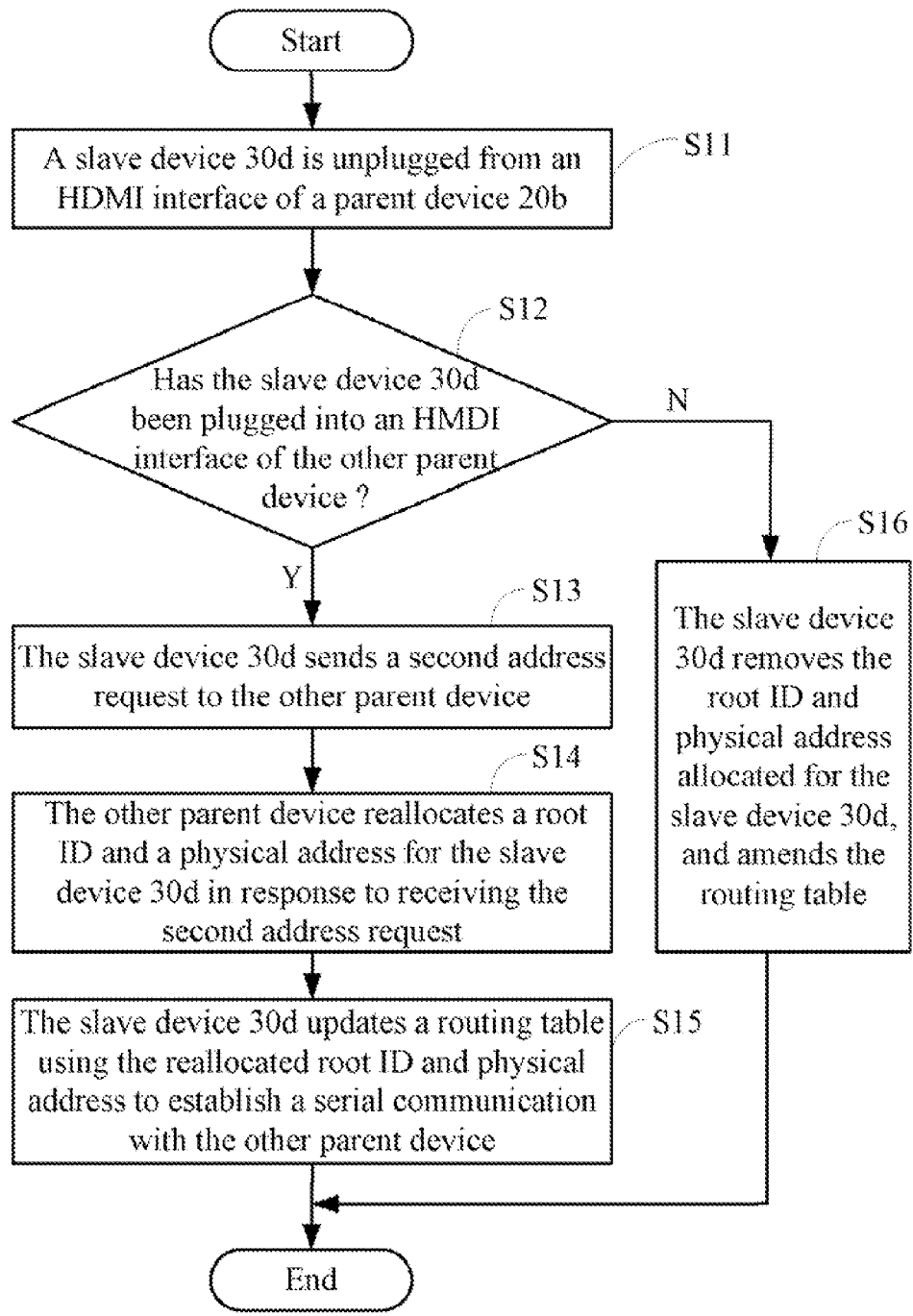
FIG. 3 is a flowchart of one embodiment of the address allocation method of the HDMI-CEC devices of the HDMI-CEC device network when a slave device is unplugged from a parent device.

FIG. 3 shows a flowchart of one embodiment of the address allocation method when a slave device is unplugged from the HDMI interface of a parent device. In the embodiment, a condition that the slave device 30d is unplugged from the HDMI interface of the parent device 20b is taken as an example.

In step S11, the slave device 30d is unplugged from the HDMI interface of the parent device 20b.

In step S12, the slave device 30d confirms whether or not the slave device 30d has been plugged into the HMDI interface of the other parent device (e.g., parent device 20c). If the slave device 30d has been plugged into the HMDI interface of the other parent device (e.g., parent device 20c), step S13 is implemented. Otherwise, the procedure goes to step S16. In the embodiment, the slave device 30d stores a value that represents the number of parent devices that the slave device 30d is plugged into. For example, when the slave device 30d is plugged into a parent device, the slave device 30d records increments of the value by one. The slave device 30d records decrements of the value by one when unplugged from the parent device. Thus, the slave device 30d can confirm whether the slave device 30d is plugged into the other parent device according to the value.

In step S13, the slave device 30d sends a second address request to the other parent device (e.g., parent device 20c).

In step S14, the other parent device reallocates a root ID and a physical address for the slave device 30d in response to receiving the second address request.

In step S15, the slave device 30d updates the routing table using the reallocated root ID and physical address to establish a serial communication with the other parent device (e.g., parent device 20c), and procedure ends.

In step S16, the slave device 30d removes the root ID and physical address allocated for the slave device 30d, and amends the routing table to disconnect the communication between the slave device 30d and the parent device 20b.

The procedure of FIG. 2 is also applicable for the parent devices 20a, 20b, 20c when they are plugged into the HDMI interface of the root device 10a or the root device 10b. At this time, the parent devices 20a, 20b, 20c are considered to be slave devices of the root device 10a or the root device 10b, and the root device 10a or the root device 10b is considered to be a parent device of the parent devices 20a, 20b, 20c. Similarly, the procedure of FIG. 2 is applicable for the parent devices 20a, 20b, 20c when they are unplugged from the HDMI interface of the root device 10a or the root device 10b.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. An address allocation method for high definite multimedia interface consumer electrics control (HDMI-CEC) devices of an HDMI-CEC device network, the HDMI-CEC devices comprising a plurality of HDMI-CEC devices consisting of at least two root devices, a plurality of parent devices, and a plurality of slave devices, each root device having a root identification (ID), the method comprising:
   confirming, by one slave device of the plurality of slave devices, whether or not a root ID and a physical address has been allocated for the slave device when the slave device is plugged into a HDMI interface of one parent device of the plurality of parent devices;
   sending, by the one slave device, a first address request to the one parent device if the slave device has not been allocated the root ID and the physical address;
   allocating, by the one parent device, the root ID and the physical address for the one slave device in response to receiving the first address request; and
   creating, by the one slave device, a routing table using the allocated root ID and the physical address to establish a serial communication with the one parent device.

2. The method according to claim 1, further comprising:
   confirming, by the one slave device, whether or not the one slave device has been plugged into an HMDI interface of the other parent devices when the one slave device is unplugged from the HDMI interface of the one parent device;
   sending, by the one slave device, a second address request to the other parent devices if the one slave device has been plugged into the HMDI interface of the other parent devices;
   reallocating, by the other parent devices, the root ID and the physical address for the one slave device in response to receiving the second address request; and
   updating, by the one slave device, the routing table using the reallocated root ID and physical address to establish a serial communication with the other parent devices.

3. The method according to claim 2, further comprising:
   removing, by the one slave device, the root ID and physical address allocated for the one slave device if the one slave device has not been plugged into the HMDI interface of the other parent devices; and
   amending, by the one slave device, the routing table to disconnect the communication between the one slave device and the one parent device.

4. The method according to claim 2, wherein the one slave device stores a value that represents a number of the parent devices that the one slave device is plugged into, and the one slave device conforms whether the one slave device is plugged into the HDMI interface of other parent devices according to the value.

5. The method according to claim 4, wherein when the one slave device is plugged into the one parent device, the one slave device records increments of the value by one; when the slave device is unplugged from the one parent device, the one slave device records decrements of the value by one.

6. The method according to claim 1, wherein the root devices are televisions.

7. The method according to claim 1, wherein the root ID allocated for the one slave device is the same as the root ID of one of the root devices.

8. The method according to claim 1, wherein when the one slave device confirms that the root ID and the physical address have already been allocated for the one slave device, and the one slave device creates the routing table using the root ID and the physical address to establish the serial communication with the one parent device.

9. A high definite multimedia interface consumer electrics control (HDMI-CEC) device of an HDMI-CEC device network, HDMI-CEC device network comprising a plurality of HDMI-CEC devices consisting of at least two root devices, a plurality of parent devices, and a plurality of slave devices, each root device having a root identification (ID), wherein when the HDMI-CEC device is plugged into an HDMI interface of one parent device of the plurality of parent devices, the HDMI-CEC device performs a method of:
   confirming whether or not a root ID and a physical address has been allocated for the HDMI-CEC device;
   sending a first address request to the one parent device if the HDMI-CEC device has not been allocated the root ID and the physical address, the first address request requesting the one parent device to allocate the root ID and the physical address for the HDMI-CEC device; and
   creating a routing table using the root ID and the physical address allocated by the one parent device to establish a serial communication with the one parent device.

10. The HDMI-CEC device according to claim 9, wherein when the HDMI-CEC device is unplugged from the HDMI interface of the one parent device, the HDMI-CEC device performs a method of:

confirming whether or not the HDMI-CEC device is plugged into the HMDI interface of the other parent devices;

sending a second address request to the other parent devices if the HDMI-CEC device is plugged into the HMDI interface of the other parent devices, the second address request requesting the other parent devices to reallocate the root ID and the physical address for the HDMI-CEC device; and updating the routing table using the root ID and the physical address reallocated by the other parent devices to establish a serial communication with the other parent devices.

11. The HDMI-CEC device according to claim 9, wherein when one slave device of the plurality of slave devices is plugged into an HDMI-CEC interface of the HDMI-CEC device, the HDMI-CEC device allocates a root ID and a physical address for the one slave device.

12. The HDMI-CEC device according to claim 11, wherein the root ID allocated for the one slave device is the same as the root ID of one of the root devices communicates with the HDMI-CEC device.

13. The HDMI-CEC device according to claim 9, wherein the root ID allocated for the HDMI-CEC device is the same as the root ID of one of the root devices communicates with the one parent device.

\* \* \* \* \*